United States Patent [19]

Consilvio

[11] 4,390,009
[45] Jun. 28, 1983

[54] SOLAR BOILER

[76] Inventor: Arthur Consilvio, 65 Poplar Ave., Bronx, N.Y. 10465

[21] Appl. No.: 379,185

[22] Filed: May 17, 1982

[51] Int. Cl.³ .............................................. F24J 3/02
[52] U.S. Cl. .................................... 126/439; 126/424
[58] Field of Search ............... 126/424, 425, 438, 439, 126/440, 429, 430

[56] References Cited

U.S. PATENT DOCUMENTS

| 820,127 | 5/1906 | Pope | 126/438 |
| 2,920,710 | 1/1960 | Howard | 126/424 |
| 3,872,854 | 3/1975 | Raser | 126/424 |
| 4,030,477 | 6/1977 | Smith | 126/438 |
| 4,121,564 | 10/1978 | Schwartz | 126/438 |

FOREIGN PATENT DOCUMENTS 373811  8/1921  Fed. Rep. of Germany ...... 126/438

Primary Examiner—James C. Yeung
Attorney, Agent, or Firm—Richard L. Miller

[57] ABSTRACT

A solar boiler whereby the rays of the sun are reflected off of variable numbering discreet mirror sections onto a central metal disc. A fan placed in the diffuser at the end of the distribution hose directs the heated air. A tracking system, powered by solar cells and coordinated by clocks assures maximum efficiency by allowing for constant sun path adjustments.

6 Claims, 2 Drawing Figures

SOLAR BOILER

BACKGROUND OF THE INVENTION

This invention deals with heating systems and more particularly with a solar boiler, utilizing as a collector discreet mirror sections that reflect rays to a central metal disc.

Heating systems can be classified in two ways: the space heaters and the central heaters. Fireplaces and electric resistance heaters fall into the first category. Each heats the air directly and thus usually serves only individual areas. Central heat systems manufacture heat in one of several kinds of furnaces, then distribute it to all parts of the house via a heat-conveying network of pipes or ducts. These are often described by naming both fuel and heat-carrying medium in the system (e.g., gas/warm air, oil/hot water, coal/steam, or any other interchangeable combination of these fuel and media). In some instances, a system may have acquired a special name, such as SOLAR HEAT although it could also be technically described by the fuel/generic name as well.

Solar energy comes from the heat produced by the rays of the sun as they strike the earth. The energy is used in many ways, the most important of which is heat, insofar as the homeowner is concerned. It is conceivable that the heat from the sun could provide a house with its entire heat requirements. Several factors affect total solar-energy utilization.

Primary among these is cost. Even though solar heat is free, methods of collecting and using that heat are relatively expensive as well as technically difficult. For example, recent analysis of costs produce the following figures:

Solar heating generally requires a collector equal in square footage to one-half the square feet of the house. Thus, a house with 1,000 square feet of living space would require 500 square feet of heat-collector area. With a good-performance heat collector running about ten dollars a square foot, the collector cost reaches about five thousand dollars.

The greatest technological problems are due to the fluctuations in the direction of the sun from season to season and the fact that it shines for only part of the 24-hour day and not at all on cloudy days.

The most difficult problem in adapting an existing home to solar energy use (often called retrofitting) is orientation. When a house has its roof edge running east and west and when the house has a double-pitch roof, it is possible to convert the southern roof exposure into a solar-energy collector.

A solar-heating system requires three basic elements. First is the collector, which absorbs the heat from the sun rays. The second is a method of storing the heat, against those periods when the sun is not shining on the collector. The third is the distribution system that carries the heat to where it is needed.

Although some conventional collectors are highly sophisticated in design and materials, the basic materials and methods are simple. The first requirement is a black plate that absorbs the heat from the sun. To this plate are fastened tubes through which the liquid being heated flows. (The liquid is what carries the heat from the collector). Ideally, the plate and tubes should be of a material that is an excellent heat conductor. All connections should be soldered to provide the efficiency of continuous metal conductance. However, adequate collectors have been built with aluminum plates and plastic. In this case, the connections are made with wire binding.

The arrangement of the tubing on the plate is determined by the total situation and most particularly by the method to be used for moving the liquid through the tubes. Ordinary convection is effective with some arrangements. It is more efficient and less limiting, however, if a pump moves the liquid.

The most common storage unit for solar systems using water is a tank of water. The system is set up so that water circulates through the heat collector and back into the storage tank, which gradually increases in temperature until it represents a huge supply of heated water. It is then moved through the heating system as required.

Some solar-energy systems circulate air through the system, instead of water. When this is the case, the storage unit is in the form of a large "crib" of concrete or concrete blocks, filled with fist-size rocks that have been rinsed and dried. The air heats these rocks.

When air is used in a solar-heating system, it is delivered through regular warm-air ducts, most efficiently with insulation on the ducts where they pass non-heated areas. Water systems, however, do not provide the best results if an attempt is made to utilize standard baseboard units and other hot water registers. The reason is that such units require water as hot as 140 degrees F., a temperature nearly impossible to achieve with conventional solar-heat collectors. Instead, heat exchangers are used with air systems, since they will extract heat from the air even though the temperature is as low as 100 degrees F.

Air collectors are considered best if heating is the only purpose of the system. Air from the collector or from storage travels through ducts the same as warm air from a furnace. The system can be engineered so that the sun provides the heat up to the limit of its capability and then the regular heating system adds whatever is necessary. Since air no hotter than 75 degrees F. will provide heating, the air system puts less demand on the collector.

Water systems on the other hand can be used for heating, for domestic water supply, bathing, etc. The pipes that carry the water are small and can often be installed in situations where warm-air ducts would be impossible. The power required to move the water through the pipes is much less than required to blow air through ducts. Hot water functions more efficiently in a heat exchanger than hot air. Meanwhile, as mentioned earlier, water must be hotter than air to provide an equivalent amount of residential heat.

The solar boiler utilizes heat produced by the rays of the sun as they strike its collector (discreet mirror sections that reflect sun rays to a central metal disc which can reach 750 degrees F.). It can be used to heat a structure utilizing a distribution system that forces the heat via a fan to where it is needed and to do steam welding and even air conditioning with steam pressure of 18 pounds. Depending upon the size and number of discreet mirror sections, the available heat can exceed 2,000 degrees F. Maximum efficiency of the solar boiler is achieved by two tracking systems, powered by solar cells that together allow the collector to follow the sun's path from sunrise to sunset and adjust for seasonal changes.

SUMMARY OF THE INVENTION

Accordingly, it is an object of the present invention to provide a solar boiler.

A further object of the present invention is to provide a solar boiler made up of reflector sections, mirrors and their supports, a central disc, and a receiving box attached to the disc.

Another object of the present invention is to provide a solar boiler having removable reflector sections, discreet mirrors mounted in a circle, a circular metal disc containing holes forming a circular pattern and a cubic shaped receiving box.

Still a further object of the present invention is to provide a solar boiler having a flexible distribution hose connecting the receiving box and a diffuser with an internally mounted fan.

Yet another object of the present invention is to provide a solar boiler whose solar reflector is pivotally connected to rigid vertical supports which are fixed to a circular shaped revolving base and further attached to a rigid mounting base.

Still a further object of the present invention is to provide a solar boiler utilizing motors, a rigid rod, hinges, a small and a large pulley and a pulley belt to allow its solar reflector to adjust its position to the sun's changing paths.

Yet still a further object of the present invention is to provide a solar boiler utilizing solar cells to power its tracking motors.

Briefly, in accordance with the present invention, there is provided a solar boiler, having a solar reflector made up of mirrors, mounts and a central, perforated metal disc. The heated air passes through a perforated metal disc and is stored in a cubic shaped manifold. The manifold directs the heated air through a distribution hose to diffuser having an internally mounted fan. Tracking mechanisms (motors, pulleys, clocks and a belt) are provided.

The foregoing objects, features and advantages of the invention will be pointed out with particularity and will, in part, become obvious from the following more detailed description of the invention, taken in conjunction with the accompanying drawing, which forms an integral part thereof.

BRIEF DESCRIPTION OF THE DRAWINGS

In the drawings.

In the various figures of the drawing, like reference characters designate like parts.

DESCRIPTION OF THE PREFERRED EMBODIMENTS

Figure 1:
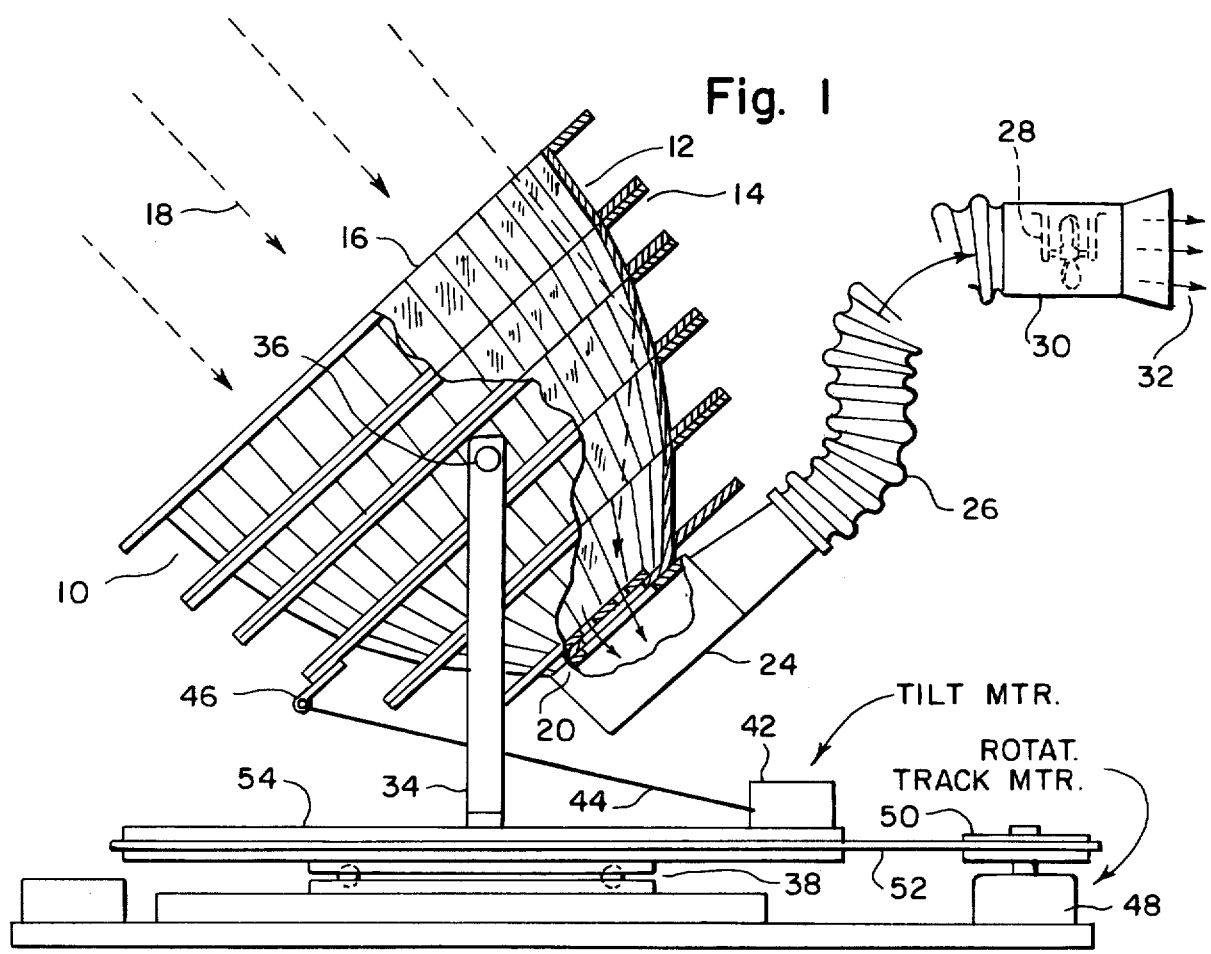
FIG. 1 is an elevational view of the present invention shown partly in cross section.

Referring now to FIG. 1, the solar reflector of the present invention is shown generally at 10 and includes removable reflector sections 12.

The removable reflector sections 12 are made up of circular mirror supports 14 which have discreet mirrors 16 mounted to them. The sun's rays 18 enter the solar reflector and are reflected by the discreet mirrors 16 to a circular metal disc 20 located at a central point of the solar reflector.

Figure 2:
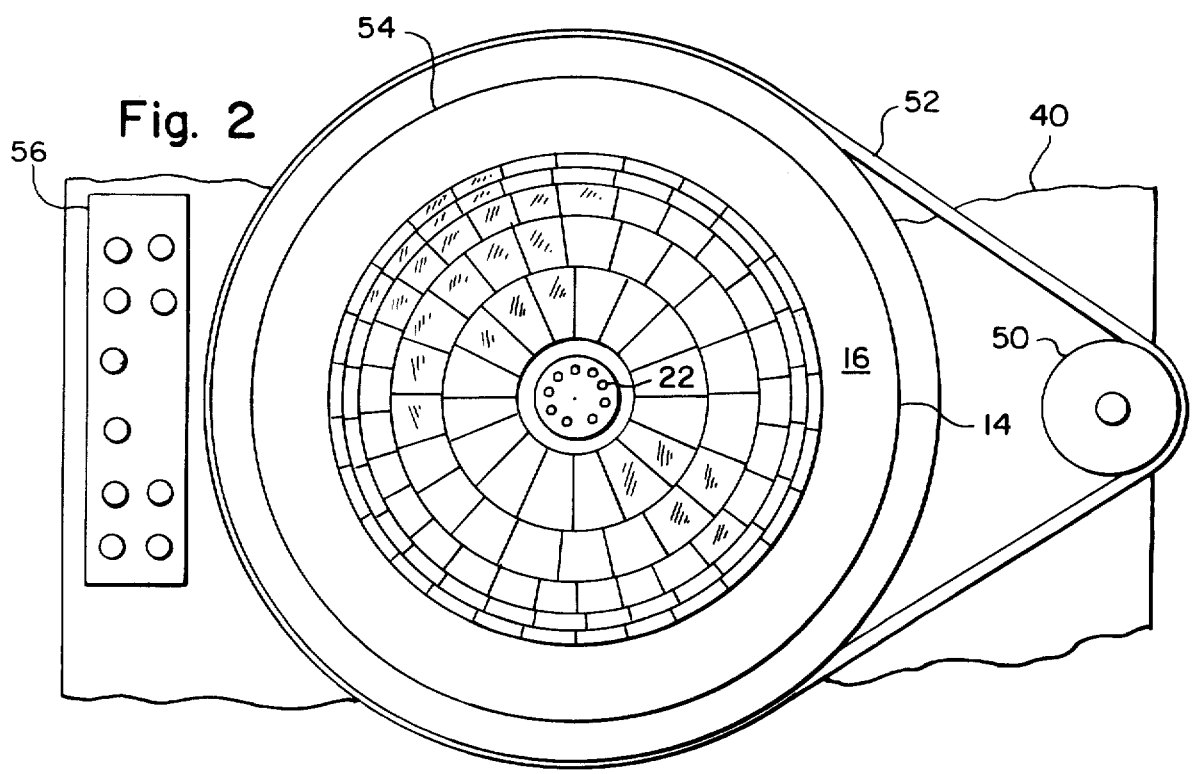
FIG. 2 is a plan view of the present invention with the solar reflector unit of FIG. 1 positioned straight up.

The air passes through the circular metal disc 20, which is shown in FIG. 2 to contain holes 22 arranged in a circular pattern.

As in FIG. 1, the heated air, after leaving the perforated circular metal disc 20, enters a cubic shaped receiving box 24 where it is stored. The stored heated air then enters a flexible distribution hose 26 of which one end is fixed rigidly to the cubic shaped receiving box 24. A fan 28 is internally mounted within a diffuser 30, which is located and rigidly fixed to the other end of the distribution hose 26. The fan 28 pulls the heated air 32 into the ambient.

The solar reflector 10 is mounted to a rigid vertical support 34 by use of a pivot point 36 which allows for vertical adjustment. The solar reflector 10 is attached via a rigid vertical support 34 to a circular revolving base 38, which is fixed to a rigid mounting base 40 and thus allows for horizontal adjustment.

Vertical movement of the solar reflector is accomplished by a tilt motor 42 which transfers energy via a rigid rod 44 to a hinged point 46 which is mounted on a circular mirror support 14. Horizontal movement of the solar reflector is accomplished by a rotary motor 48 attached to a small pulley 50 which transfers energy via a pulley belt 52 to a large pulley 54 which is rigidly fixed to the circular revolving base 38. Tracking motors may be synchronous clocks powered by a conventional alternating current source, or motor servoed to (clock mechanism not shown in the drawings) that are powered by solar cells 56 that are fixed to the rigid mounting base 40.

Although particular types of materials have been mentioned, it is understood that substitutions of these materials can also be utilized as long as they carry out the features of the invention.

There has been disclosed heretofore the best embodiment of the invention presently contemplated. However, it is to be understood that various changes and modifications may be made thereto without departing from the spirit of the invention.

I claim:

1. A solar boiler comprising:

a solar reflector;

reflector sections constituting the periphery of said solar reflector;

mirror supports defining the longitudinal boundaries of said reflector sections;

mirrors mounted on the inner surfaces of said mirror supports;

a disc located at the central point of said solar reflector;

a plurality of holes in said disc;

a receiving box adjacent to said disc;

a means for causing said reflector to continuously track the sun's rays and focus said rays on said disk, whereby said disk is heated;

a fluid distribution hose attached to said receiving box;

a means for moving a fluid through said fluid distribution hose from said disk to a diffuser attached to the other end of said fluid distribution hose, whereby said fluid will transfer heat from said disk to the ambient into which said diffuser discharges said fluid, wherein said solar reflector is attached to vertical supports at a pivot point and said vertical supports are fixed to a revolving base which is further attached to a mounting base; and wherein said means for causing said reflector to continuously tract the sun's rays, is a first motor for tilting said reflector with respect to said vertical supports, a rod attached to said first motor, a hinged point which is fixed to end of said rod, a second motor for revolving said solar reflector with respect to said mounting base, a first pulley mounted to said second motor, a second pulley secured to said mounting base, and a pulley belt connecting said first pulley to said second pulley.

2. A solar boiler as in claim 1, wherein there are solar cells attached to said mounting base for supplying the power for operating said first motor and said second motor.

3. A solar boiler as in claim 2, wherein said distribution hose is flexible and means for moving a fluid through said fluid distribution hose is a fan mounted internally in the said diffuser.

4. A solar boiler as in claim 2, wherein at least one of said motors is a synchronous clocks powered by a conventional alternating current source.

5. A solar boiler as in claim 3, wherein said vertical supports are rigid, said revolving base is circular in shape, said mounting base is rigid, and said rod is rigid.

6. A solar boiler as in claim 5, wherein said first pulley is small and said second pulley is large.

* * * * *